(12) United States Patent
Young et al.

(10) Patent No.: US 7,777,639 B2
(45) Date of Patent: Aug. 17, 2010

(54) INDICATOR DISPLAY MODULE

(75) Inventors: Dennis R. Young, Sheffield Village, OH (US); David A. Straka, Hudson, OH (US)

(73) Assignee: Delta Systems, Inc., Streetsboro, OH (US)

( * ) Notice: Subject to any disclaimer, the term of this patent is extended or adjusted under 35 U.S.C. 154(b) by 305 days.

(21) Appl. No.: 11/956,409

(22) Filed: Dec. 14, 2007

(65) Prior Publication Data

US 2009/0153314 A1 Jun. 18, 2009

(51) Int. Cl.
G08B 3/00 (2006.01)
G08B 5/00 (2006.01)
G08B 7/00 (2006.01)

(52) U.S. Cl. .................. 340/691.1; 340/459; 340/691.6; 340/693.5; 340/815.69

(58) Field of Classification Search .................. 340/459, 340/691.1, 691.6, 693.5, 815.69
See application file for complete search history.

(56) References Cited

U.S. PATENT DOCUMENTS

| 5,528,007 | A | 6/1996 | Williams et al. |
| 5,548,888 | A | 8/1996 | Williams |
| 5,659,376 | A * | 8/1997 | Uehara et al. .................. 349/58 |
| 5,662,213 | A | 9/1997 | Kattler et al. |
| 5,775,482 | A | 7/1998 | Wolfe et al. |
| 6,377,168 | B1 | 4/2002 | Harvey |
| 6,655,975 | B1 | 12/2003 | Liedtke |
| 6,835,090 | B1 * | 12/2004 | Liedtke ....................... 439/521 |
| 7,034,674 | B2 | 4/2006 | Harvey |
| 7,154,814 | B2 | 12/2006 | Straka |

* cited by examiner

*Primary Examiner*—Travis R Hunnings
(74) *Attorney, Agent, or Firm*—Tarolli, Sundheim, Covell & Tummino LLP

(57) ABSTRACT

An indicator display module includes a display face for informing an operator of a monitored condition and a housing having first and second ends. The display face is attached to the first end. The housing provides support to electrical components located within the housing. A cover is fixedly attached to the housing and engages the second end of the housing. A seal is positioned within the housing, forming a sealed cavity around the electrical components stored within the housing.

31 Claims, 6 Drawing Sheets

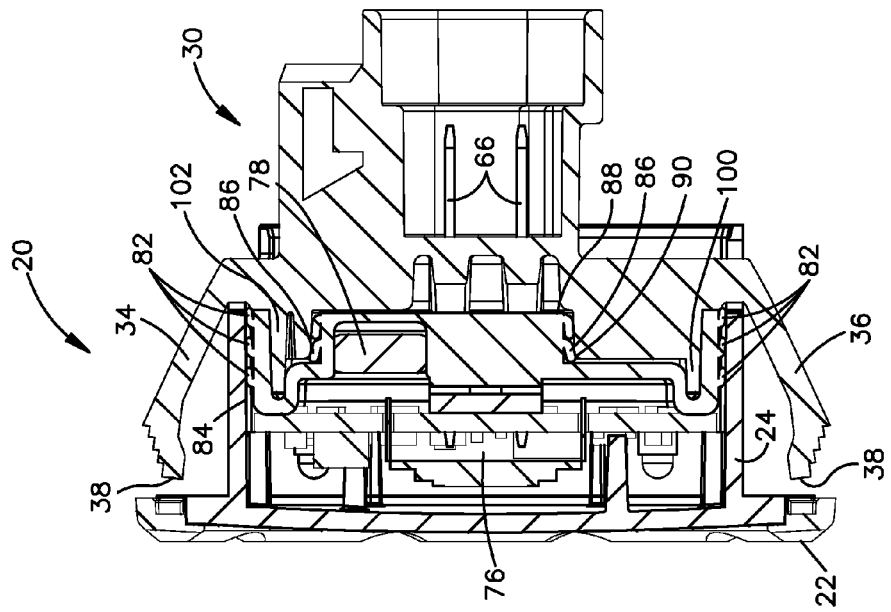
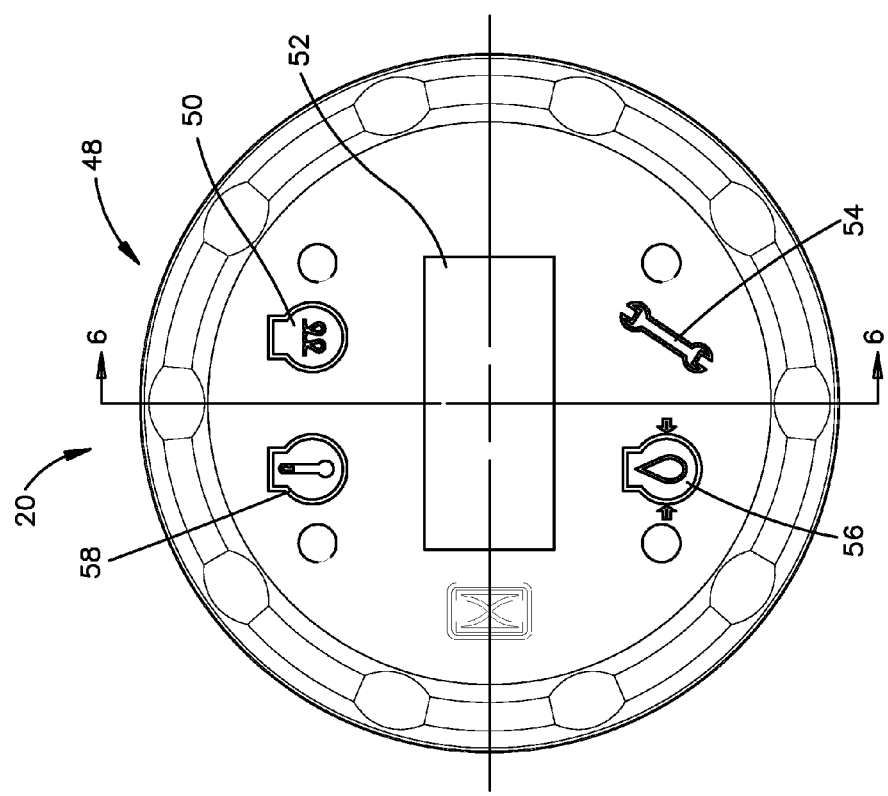
Fig.5
Fig.6

INDICATOR DISPLAY MODULE

FIELD OF THE INVENTION

The present disclosure relates generally to an indicator display module for power equipment, and in particular, the present disclosure concerns an indicator display module having a sealed assembly, protecting the internal components from contaminates.

BACKGROUND

Power equipment that includes for example, lawn and garden tractors are typically provided with a display unit, indicating to the operator different parameters relating to the performance of the power equipment. The display units are usually positioned on the dash panel of the power equipment, conveniently within the operator's viewing area.

Lawn and garden tractors are continuously exposed to harsh environmental conditions, including moisture, rain, dust, snow, oil, and the like, often causing failure in electronic components that are becoming more commonly used in modern power equipment. Display units are no exception, using printed circuit boards (PCBs) and other electronics to indicate to the operator various operating conditions relating to the operation of the power equipment, including engine temperature, hours of operation, and oil pressure. Display unit electronics are equally susceptible to the harsh environmental conditions, which is frequently the root cause for failure, resulting in warranty costs and/or a shortened product life cycle of the display unit.

SUMMARY

The present disclosure relates to an indicator display module comprising a display face for informing an operator of a monitored condition and a housing having first and second ends. The display face is attached to the first end. The housing provides support to electrical components located within the housing. A cover is fixedly attached to the housing and engages the second end of the housing. A seal is positioned within the housing, forming a sealed cavity around the electrical components stored within the housing.

The present disclosure further relates to an indicator display module for use with power equipment comprising a display face for informing an operator of a monitored condition and a housing having first and second ends. The display face is attached to the first end. The housing provides support to electrical components located within the housing. A cover fixedly attached to the housing engages the second end of the housing. A seal is positioned within the housing, forming a hermetically sealed cavity around the electrical components stored within the housing. The seal includes a recess for supporting a desiccant pill positioned therein.

The present disclosure also relates to an indicator display module for use with power equipment comprising a display face for informing an operator of a monitored condition and a housing having first and second ends. The display face is sealingly attached to the first end. The housing offers support to electrical components therein. A cover fixedly attached to the housing engages the second end. A seal is positioned within the housing, forming a hermetically sealed cavity with the display face and housing around the electrical components stored within the housing. The seal comprises a recess for supporting a desiccant pill positioned therein, a plurality parametrical ridges around its perimeter for engaging an internal perimeter of the housing, and an abutment projecting a plurality of ribs. The plurality ribs engage an internal perimeter of the cover.

The present disclosure yet further relates to an indicator display module comprising a display face for informing an operator of a monitored condition and a housing having first and second ends and interior walls bounding an interior region. The display face is attached to the first end and the housing supports electrical components within the interior region. A cover fixedly attached to the housing, engaging the second end of the housing for enclosing the interior region. A seal is positioned within the housing, engaging the interior walls and forming a sealed cavity around the electrical components stored within the housing.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, in which:

FIG. 5 is a front elevation view of the indicator display module of FIG. 2;

FIG. 6 is a sectional view of the indicator display module of FIG. 5 along section lines 6-6;

DETAILED DESCRIPTION OF THE DRAWINGS AND PREFERRED EMBODIMENTS

Figure 1:
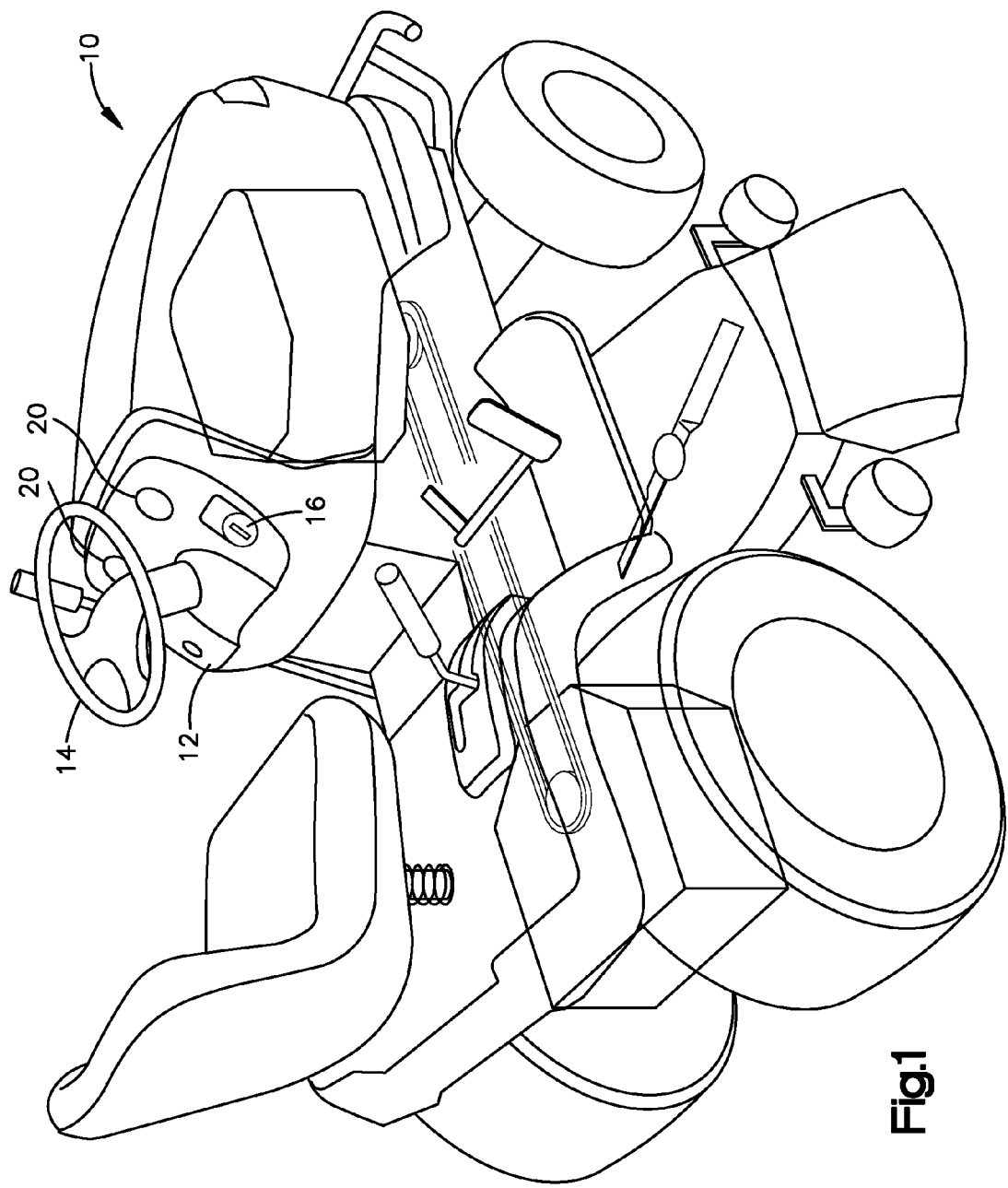
FIG. 1 is an illustration of a lawn and garden tractor.

With reference now to the figures and in particular to FIG. 1, a lawn tractor 10 is illustrated having an instrument panel 12 positioned behind a steering wheel 14 for operating the directional control of the lawn tractor. The instrument panel 12 includes an ignition switch 16 for starting the lawn tractor 10 and one or more indicator display modules 20. While a lawn tractor 10 is shown, the indicator display modules 20 can be used on any motorized land or marine vehicles, or any type of power equipment without departing from the spirit and scope of the claimed invention.

Figure 2:
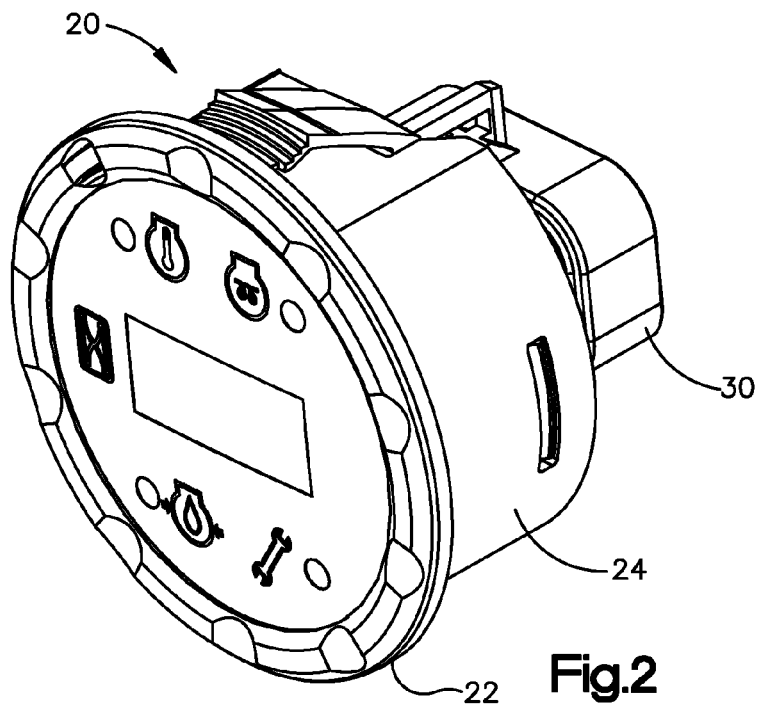
FIG. 2 is a perspective view of an indicator display module constructed in accordance with one exemplary embodiment.
Figure 3:
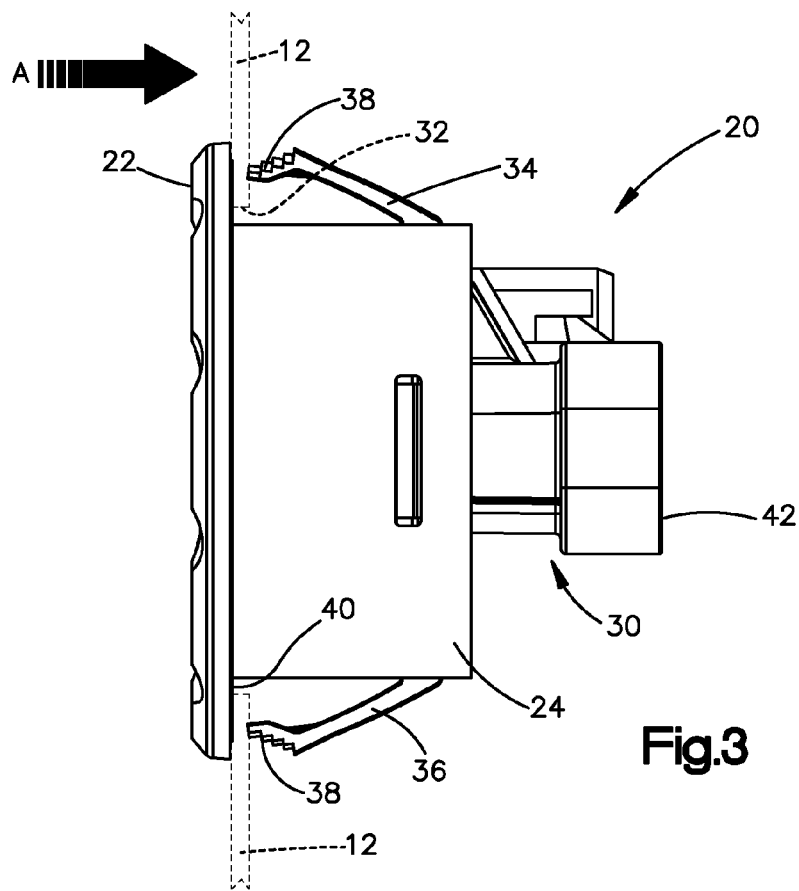
FIG. 3 is an elevated side view of the indicator display module of FIG. 2.
Figure 4:
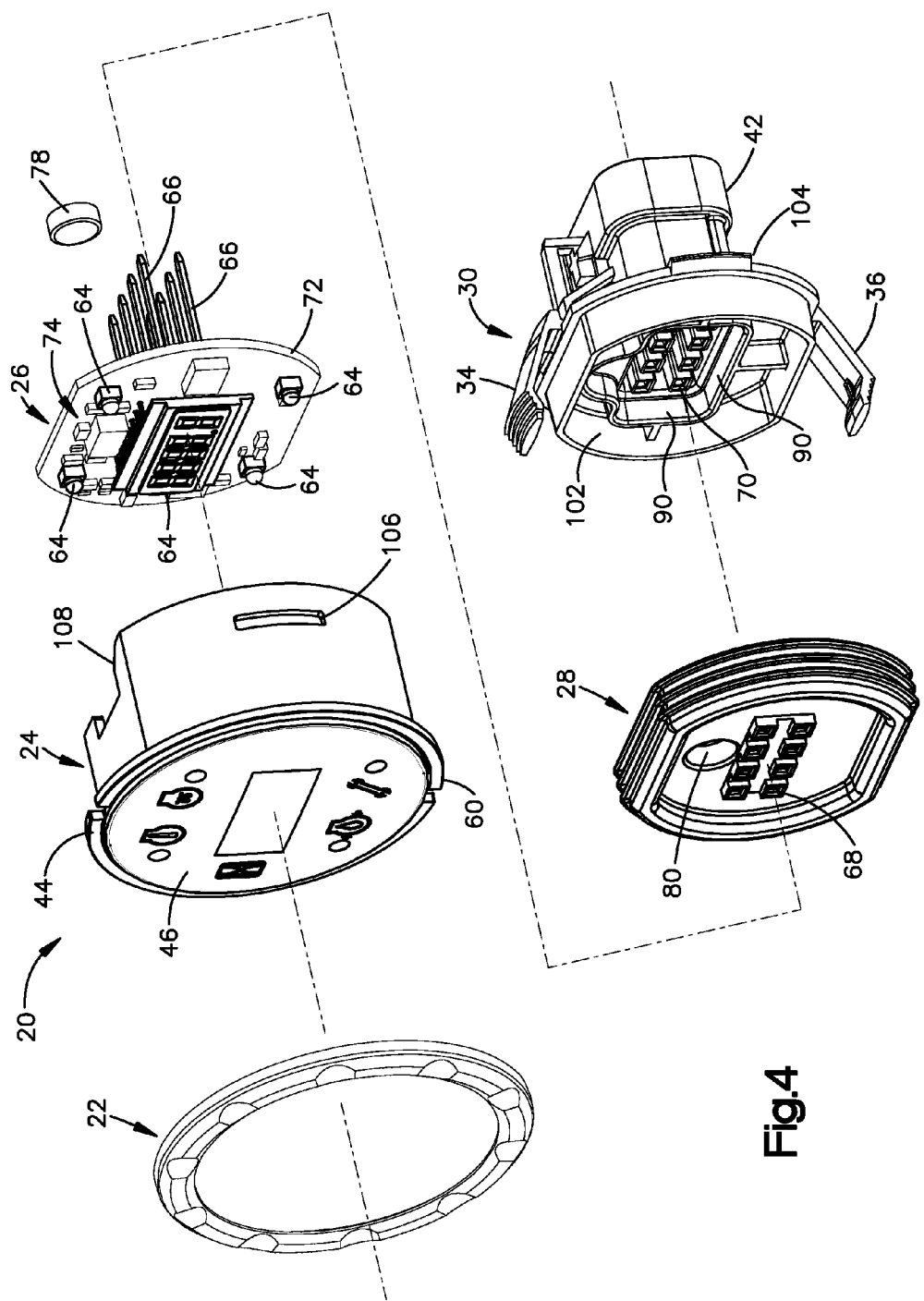
FIG. 4 is an exploded assembly view of the indicator display module of FIG. 2.

Illustrated in FIGS. 2-4 is an indicator display module 20 constructed in accordance with an example embodiment. The display module 20 is similarly constructed as the display modules illustrated in FIG. 1. FIG. 2 illustrates a perspective view of the display module 20, while FIG. 3 is a side elevation view of the display module, showing the position of the instrument panel 12 in phantom. FIG. 4 is an exploded assembly view of the indicator display module 20 of FIG. 2, including a bezel 22, housing 24, electronic unit 26, seal 28, and cover 30. The display module 20 is secured to the instrument panel 12 by passing the module in the direction of the arrow A in FIG. 3 through an opening 32 in the instrument panel.

Upon passing of the display module 20 through the opening 32, first and second snap wings 34, 36 respectively, spring outward from a deflected position (as they pass through the opening 32) to a securing positioning for holding the display module by ends 38, as illustrated in FIG. 3. The snap wings 34, 36 apply pressure at their ends 38 between the instrument panel 12 and a rear face 40 of the housing 24. By attaching the snap wings 34, 36 to the cover 30, and not the housing 24, the overall length of the housing can be reduced.

Prior to the insertion of the indicator display module 20 into the instrument panel 12, a wiring harness (not shown) is attached to an adapter 42 for providing power and communications to the electronic unit 26. A preassembly process of the components illustrated in FIG. 4 produces the indicator display module 20 prior to its insertion into the instrument panel 12.

The housing 24 includes a translucent plate 44 made from polycarbonate upon which a decal 46 is attached by a heat transfer process. The decal 46 includes several status indicators 48 for alerting the operator of various operating parameters of the lawn tractor 10. The status indicators 48 in the illustrated embodiment, as best seen in FIG. 5, include a pre-heat condition indicator 50 for diesel engines, an hour meter 52 for tracking the number of hours the equipment is used, a diagnostic indicator 54 notifying the operator of needed maintenance, an oil pressure indicator 56, and an engine temperature indicator 58. The status indicators 48 could provide any other type of information to the operator while remaining within the scope of the claimed invention.

After the decal 46 is thermally attached to the translucent plate 44, the bezel 22 is sonically welded to the housing 24 against an abutment 60 for protecting the decal 46 from scratches or wear. The electronic unit 26 has a plurality of light emitting diodes (LEDs) positioned for illuminating their respective indicator 48 in the decal 46, which can then be viewed by the operator through the decal 46.

FIG. 6 illustrates a sectional view of the indicator display module 20 along section lines 6-6 of FIG. 5. Further illustrated in FIG. 6 is the positioning of the electronic unit 26, seal 28, and cover 30 within the housing 24. The electronic unit 26 includes two rows of pin connectors 66 that pass through respective orifices 68 in the seal 28 and respective openings 70 in the cover 30, for engaging a wiring harness (not shown). The pin connectors 66 provide data and/or power to the electronic unit 26. The electronic unit 26 further includes a printed circuit board 72 (PCB) comprising application specific integrated circuits (ASIC), liquid crystal displays, LEDs and other electronic components, collectively electronics 74 that are mounted to the PCB 72.

Figure 7:
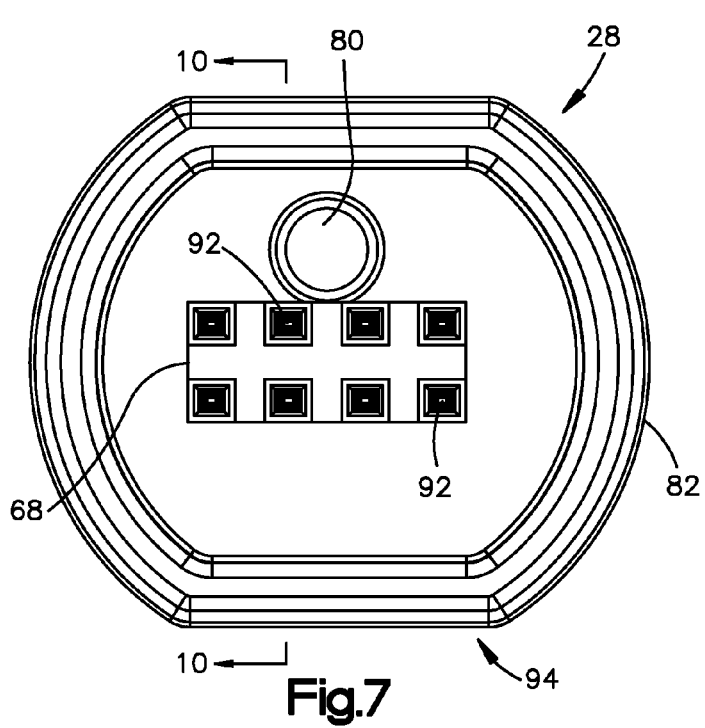
FIG. 7 is a front elevation view of a seal constructed in accordance with one embodiment.
Figure 8:
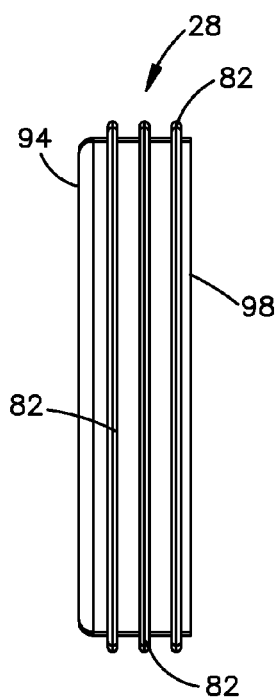
FIG. 8 is a side elevation view of the seal of FIG. 7.
Figure 9:
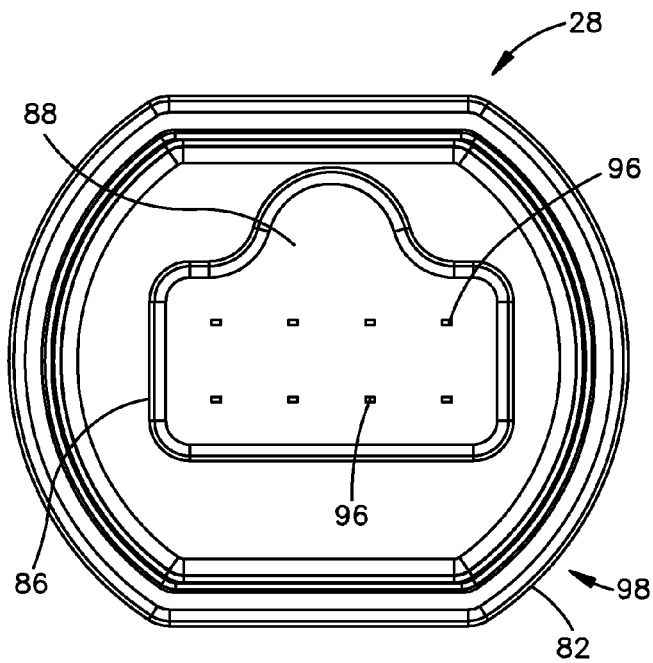
FIG. 9 is a rear elevation view of the seal of FIG. 7.
Figure 10:
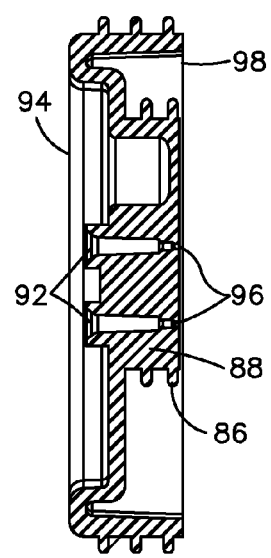
FIG. 10 is a sectional view of the seal of FIG. 7 along section lines 10-10.

The seal 28 is made from silicone having a relative hardness of approximately 45 durometer on a Shore A scale, but could be any made from any elastomeric material without departing from the spirit and scope of the claimed invention. The seal 28 provides a hermetically sealed cavity 76 between the housing 24 and cover 30 with the printed circuit board 72 encapsulated therein. The hermetically sealed cavity 76 is best seen in the sectional view of FIG. 6 in conjunction with the seal 28 illustrated in FIGS. 7-10. The hermetically sealed cavity 76 prevents moisture, debris, and other contaminates from entering the cavity, thus extending the product-lifecycle of the electronic unit 26 and indicator display module 20. The internal conditions in the hermetically sealed cavity 76 are further enhanced by a desiccant pill 78, secured by an interference-fit in a blind recess 80 (FIG. 7) of the seal 28. The desiccant pill 78 reduces moisture within the hermetically sealed cavity 76.

The configuration of the seal 28 and its mating components facilitate the hermetically sealed cavity 76. First, a plurality of exterior ridges 82 surrounds the perimeter of the seal 28, forming a compression-fit connection with interior walls 84 of the housing 24. Second, a plurality of interior ridges 86 surrounds a posterior abutment 88 of the seal 28, forming a compression-fit connection with sealing walls 90 of the cover 30, as best seen in FIGS. 4 and 6. Third, each pin connector 66 is subjected to a sealing press-fit connection through its corresponding orifice 68, having a larger first opening 92 on a front side 94 of the seal 28. The orifices 68 form a tapered-like profile to a second smaller area opening 96 from which the pins exit out a rear side 98 of the seal's posterior abutment 88. Finally, an annular pocket 100 of the seal 28 fits over an outer rim 102 of the cover 30. The above seal 28 engagements with the cover 30 and the housing 24 in combination with its flexible composition provide the hermetically sealed cavity 76.

The cover 30 secures the seal 28 and electronic unit 26 to the housing 24 through a pair of clasps 104, symmetrically located about the cover. The clasps 104 of the cover 30 are received through corresponding slots 106, locking the cover into the housing 24. The preassembly construction illustrated in FIG. 4 is designed to prevent error in assembly. This is achieved first by constructing the first and second snap wings 34, 36 to different widths. When the cover 30 is advanced for connection to corresponding slots 106, the snap wings 34, 36 reside in corresponding recesses 108 located in the housing 24. The recesses 108 are sized to mate with their corresponding snap wing 34, 36, thus the larger of the two snap wings will only fit in the larger sized recess 108. As such, the cover 30 can only attach to the housing 24 in one orientation, preventing improper assembly of the indicator display module 20. Another error reducing feature in the display module 20 is appreciated during its assembly into the instrument panel 12 of the lawn tractor 10 through a keying feature produced by the geometry of the housing 24. The keying feature includes at least one flat portion about the perimeter of the housing 24 that allows for the insertion of the display module into the panel 12 in a single orientation. If multiple flats are used, the size of each flat can vary so that the corresponding openings in the panel 12 allow for insertion of the display module 20 in a single orientation, preventing improper orientation during assembly.

Yet another error reducing feature of the indicator display module 20 is provided by the engagement between the electronic unit 26 and cover 30. This feature is achieved by offsetting the pin connectors 66 in a non-symmetrical orientation that must align with the corresponding openings 70 in the cover 30. Such construction requires the profile of the electronic unit 26 and its coupling with the outer rim 102 of the cover 30 to be assembled only in one (proper) orientation, which is verified by the successful passage of the pin connectors 66 through their respective openings 70.

Figure 11:
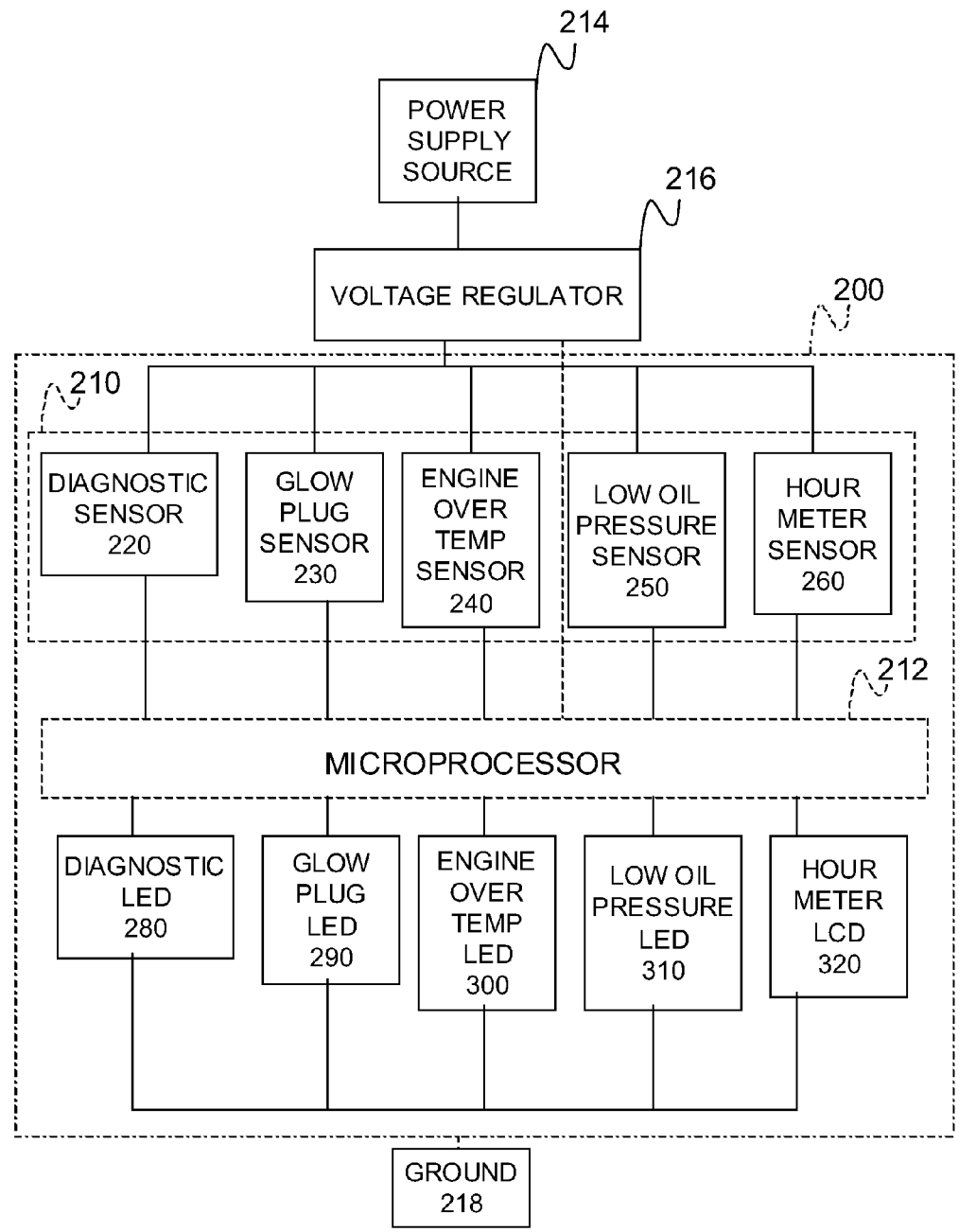
FIG. 11 is a block diagram illustrating the electrical configuration of the indicator display module of FIG. 1.

Referring now to FIG. 11 is a block diagram illustrating an electrical circuit 200 for the indicator display module 20. The electrical circuit 200 comprises a plurality of sensors 210 and a microprocessor 212. In an alternative embodiment (not shown), the microprocessor 212 is an Application Specific Integrated Circuit (ASIC).

Power is supplied to the circuit 200 from a power supply source 214. A typical power supply source would include, for example, a 12 VDC battery. A voltage regulator circuit 216 is coupled to the power source 214, reducing the voltage to a specified level for internal circuits and components within the electrical circuit 200. In one example embodiment, the voltage regulator reduces a 12 VDC power supply voltage from the power supply source 214 to a 5 VDC output. The voltage regulator circuit 216 regulates the voltage to both sensors 210 and/or a microprocessor 212 located within circuit 200. A ground 218 closes the circuit 200 and could be for example, a connection to a ground terminal of the power supply source 214.

The sensors 210 include diagnostic sensor 220, glow plug sensor 230, engine over-temperature sensor 240, low oil pressure sensor 250, and an hour meter sensor 260. While the term sensor or sensors is being used generically, it could include a single electrical component such as a thermal couple or a separate discrete circuit without departing from the spirit and scope of the claimed invention.

The sensors 210 are coupled to the microprocessor 212, providing input signals relating to various operating conditions of the lawn tractor 10. For example, the sensors 210 could include a signal from a magneto (not shown) associated with an engine in the lawn tractor 10 or power equipment for cycling an hour meter that tracks the number of hours the engine operates. Alternatively, the sensors 210 could provide a signal relating to oil pressure, temperature, or indicating that an internal heating element such as a glow plug is in operation to the microprocessor 212.

The microprocessor circuit 212 evaluates the signals provided from the sensors 220, 230, 240, 250, and 260 against predetermined conditions and/or thresholds. Should the predetermined condition and/or threshold corresponding sensor be satisfied, a respective LED is illuminated or LCD is cycled associated with status indicator 48 in FIG. 5. For example, if sensor 240 provides a signal that the temperature of the engine in the lawn tractor 10 is above a predetermined threshold in the microprocessor 212, an engine over-temperature 300 is illuminated, lighting corresponding to status indicator 58.

Similarly, if sensor 220 provides a signal that an operating condition of the engine in the lawn tractor 10 is above a predetermined threshold in the microprocessor 212, a diagnostic LED 280 is illuminated, lighting corresponding to status indicator 54. If sensor 230 provides a signal indicating the glow plugs are enabled, heating the engine in the lawn tractor 10 and satisfying a predetermined condition in the microprocessor 212, a glow plug LED 290 is illuminated, lighting corresponding to status indicator 50. If sensor 250 provides a signal that the oil pressure in the engine in the lawn tractor 10 is below a predetermined threshold in the microprocessor 212, a low oil pressure LED 310 is illuminated, lighting corresponding to status indicator 56. If sensor 260 provides a signal that the engine of the lawn tractor 10 is on, satisfying a predetermined condition in the microprocessor 212, an hour meter LCD 320 cycles corresponding status indicator 52.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

We claim:

1. An indicator display module comprising:
   a display face for informing an operator of a monitored condition;
   a housing having first and second ends, the display face being attached to said first end, the housing supporting electrical components therein;
   a cover fixedly attached to said housing and engaging said second end of said housing;
   a seal positioned within said housing, forming a sealed cavity around the electrical components stored within the housing; and
   said seal further comprises a plurality of ridges around its perimeter for engaging an internal perimeter of the housing.

2. The indicator display module of claim 1, wherein said seal is made from silicone.

3. The indicator display module of claim 1 further comprising a desiccant tablet positioned within said sealed cavity.

4. The indicator display module of claim 3, wherein said seal further comprises a blind recess molded into the seal for supporting said desiccant tablet.

5. The indicator display module of claim 1, wherein said seal further comprises a plurality of ridges around an abutment extending from the seal, the plurality of ridges for engaging an internal perimeter of the cover.

6. The indicator display module of claim 1, wherein said display face includes a decal attached to a translucent plate by a heat transfer process.

7. The indicator display module of claim 1 further comprising a bezel that is welded to the housing and surrounding the face plate.

8. An indicator display module comprising:
   a display face for informing an operator of a monitored condition;
   a housing having first and second ends, the display face being attached to said first end, the housing supporting electrical components therein;
   a cover fixedly attached to said housing and engaging said second end of said housing;
   a seal positioned within said housing, forming a sealed cavity around the electrical components stored within the housing; and
   said electrical components further comprise a plurality of pin connectors that project through a respective orifice in said seal, the orifices forming a sealing connection with each of said plurality of pin connectors.

9. The indicator display module of claim 8, wherein said seal is made from silicone.

10. The indicator display module of claim 8 further comprising a desiccant tablet positioned within said sealed cavity.

11. The indicator display module of claim 10, wherein said seal further comprises a blind recess molded into the seal for supporting said desiccant tablet.

12. The indicator display module of claim 8, wherein said seal further comprises a plurality of ridges around an abutment extending from the seal, the plurality of ridges for engaging an internal perimeter of the cover.

13. The indicator display module of claim 8, wherein said display face includes a decal attached to a translucent plate by a heat transfer process.

14. The indicator display module of claim 8 further comprising a bezel that is welded to the housing and surrounding the face plate.

15. An indicator display module for use with power equipment comprising:
   a display face for informing an operator of a monitored condition;
   a housing having first and second ends, the display face being attached to said first end, the housing supporting the electrical components therein;
   a cover fixedly attached to said housing and engaging said second end; and a seal positioned within said housing, forming a hermetically sealed cavity around the electrical components stored within the housing, the seal having a recess for supporting a desiccant pill positioned therein.

16. The indicator display module of claim 15, wherein said cover includes a first snap wing of a first size and a second snap wing of a second size different than said first size, the first and second snap wings securing said display module to the power equipment.

17. The indicator display module of claim 16, wherein said first and second snap wings are received by a corresponding recess in said housing.

18. The indicator display module of claim 15, wherein said power equipment includes a lawn tractor.

19. The indicator display module of claim 15, wherein said seal is made from silicone rubber.

20. The indicator display module of claim 15, wherein said seal further comprises a plurality of ridges around its perimeter for engaging an internal perimeter of the housing.

21. The indicator display module of claim 15, wherein said seal further comprises a plurality of ridges around an abutment extending from the seal, the plurality of ridges for engaging an internal perimeter of the cover.

22. The indicator display module of claim 15, wherein said electrical components further comprise a plurality of pin connectors that project through a respective orifice in said seal, the orifices forming a sealing connection with each of said plurality of pin connectors.

23. An indicator display module for use with power equipment comprising:
   a display face for informing an operator of a monitored condition;
   a housing having first and second ends, the display face sealingly attached to said first end, the housing providing support to electrical components therein;
   a cover fixedly attached to said housing and engaging said second end; and
   a seal positioned within said housing, forming a hermetically sealed cavity with said display face and housing around the electrical components stored within the housing, the seal having:
   i) a recess for supporting a desiccant pill positioned therein;
   ii) a plurality parametrical ridges around its perimeter for engaging an internal perimeter of the housing; and
   iii) an abutment projecting a plurality of ribs, the plurality ribs for engaging an internal perimeter of the cover.

24. The indicator display module of claim 23, wherein said electrical components further comprise a plurality of pin connectors that project through a respective orifice in said seal, the orifices forming a sealing connection with each of said plurality of pin connectors.

25. The indicator display module of claim 24 said orifices in said seal have a tapered opening, forming the sealing connection with said plurality of pin connectors.

26. An indicator display module comprising:
   a display face for informing an operator of a monitored condition;
   a housing having first and second ends and interior walls bounding an interior region, the display face being attached to said first end and the housing supporting electrical components within the interior region;
   a cover fixedly attached to said housing and engaging said second end of said housing for enclosing the interior region;
   a seal positioned within said housing, engaging the interior walls, forming a sealed cavity around the electrical components stored within the housing; and
   said cover providing sealing walls on an internal perimeter that compress said seal against pins of a in connector attached to a printed circuit board forming an isolated contact against each in of the in connector.

27. The indicator display module of claim 26 further comprising a keying feature about said housing for positioning the display module into a panel of a lawn tractor in a single orientation.

28. The indicator display module of claim 26, wherein said seal further comprises an aperture supporting a desiccant tablet and a plurality of ribs formed about the seal's perimeter for supporting the seal in said housing.

29. An indicator display module comprising:
   a display face for informing an operator of a monitored condition;
   a housing having first and second ends and interior walls bounding an interior region, the display face being attached to said first end and the housing supporting electrical components within the interior region;
   a cover fixedly attached to said housing and engaging said second end of said housing for enclosing the interior region;
   a seal positioned within said housing, engaging the interior walls, forming a sealed cavity around the electrical components stored within the housing; and
   said cover further comprises a plurality of snap wings for securing the display module to a panel of a lawn tractor and minimizing the length of said housing.

30. The indicator display module of claim 29 further comprising a keying feature about said housing for positioning the display module into a panel of a lawn tractor in a single orientation.

31. The indicator display module of claim 29, wherein said seal further comprises an aperture supporting a desiccant tablet and a plurality of ribs formed about the seal's perimeter for supporting the seal in said housing.

* * * * *